US006823186B2

(12) United States Patent
Salokannel et al.

(10) Patent No.: US 6,823,186 B2
(45) Date of Patent: Nov. 23, 2004

(54) APPARATUS, AND ASSOCIATED METHOD, FOR ALLOCATING CHANNEL CAPACITY IN A WIRELESS COMMUNICATION SYSTEM

(75) Inventors: Juha Salokannel, Kangasala (FI); Arto Palin, Lempäälä (FI); Jukka Reunamäki, Tampere (FI)

(73) Assignee: Nokia Corporation, Espoo (FI)

( * ) Notice: Subject to any disclaimer, the term of this patent is extended or adjusted under 35 U.S.C. 154(b) by 472 days.

(21) Appl. No.: 09/752,425

(22) Filed: Dec. 28, 2000

(65) Prior Publication Data

US 2002/0086678 A1 Jul. 4, 2002

(51) Int. Cl.[7] .................................................. H04Q 7/20
(52) U.S. Cl. .................... 455/452.1; 455/41.2; 370/330
(58) Field of Search .............................. 455/452, 41.2, 455/450, 451, 509, 452.1, 443, 444; 370/321, 329, 330, 335, 341, 431, 468, 433, 437

(56) References Cited

U.S. PATENT DOCUMENTS 6,519,460 B1 * 2/2003 Haartsen .................. 455/452.1

FOREIGN PATENT DOCUMENTS

| WO | WO 01/11830 | 2/2001 |
| WO | WO 01/17136 | 3/2001 |

OTHER PUBLICATIONS

Johansson, Per, et al.; "Short Range Radio Based AD–HOC Networking: Performance and Properties"; XP–000903607; 1999 IEEE; International Conference on Communications; Conference Record, Vancouver, Canada, Jun. 6–10 1999; IEEE International Conference on Communications, New York, New York: IEEE, US, vol. 3, Jun. 6, 1999, pp. 1414–1420.

* cited by examiner

Primary Examiner—Jean Gelin

(57) ABSTRACT

Apparatus, and an associated method, for facilitating inter-slave device communications in a radio communication system, such as a Bluetooth-compatible communication system. Channel allocations to permit the effectuation of the communications between the slave devices are controlled by a master device. Indications of the channel allocations are provided by the master device to the slave devices, and thereafter, a radio link is formed directly between the slave devices and communications therebetween are effectuated.

12 Claims, 3 Drawing Sheets

APPARATUS, AND ASSOCIATED METHOD, FOR ALLOCATING CHANNEL CAPACITY IN A WIRELESS COMMUNICATION SYSTEM

The present invention relates generally to a manner by which to allocate communication capacity to facilitate communications between communication stations of a radio communication system, such as a Bluetooth-compatible communication system. More particularly, the present invention relates to apparatus, and an associated method, by which to allocate communication capacity for communications between slave devices of a Bluetooth piconet, or other radio communication system. Through operation of an embodiment of the present invention, the communication capacity in a Bluetooth piconet is more efficiently utilized as direct communications are permitted within a single piconet. The need to communicate by way of a master device or to define multiple piconets is obviated.

BACKGROUND OF THE INVENTION

Technological advancements in communication technologies have permitted the introduction, and popularization of usage, of new types of communication systems. Communication devices of both increased processing capacities and of smaller sizes are able to be utilized in applications and in situations not previously possible or practical.

New wireless communication systems, and communication devices operable therein, have been made possible as a result of such advancements. A cellular communication system capable of communicating packet data is exemplary of a new wireless communication system made possible as a result of technological advancements. A cellular communication system includes a network infrastructure which is installed in a geographical area and affixed in position. Mobile terminals operable in a cellular communication system communicate by way of the network infrastructure.

Additional types of communication systems have been proposed which also take advantage of the advancements in communication technologies. For instance, ad hoc, i.e., infrastructure-free, communication systems have been proposed. The Bluetooth standard sets forth an ad hoc, communication system which provides for wireless connectivity of a large number of different devices. Bluetooth devices are connectable in an ad hoc manner by way of short-distance radio links, thereby to permit data to be communicated between such Bluetooth devices. Each Bluetooth device forms a node in the Bluetooth system, sometimes referred to as a Bluetooth piconet. A Bluetooth system, unlike a cellular communication system, though, does not have a fixed infrastructure.

The Bluetooth devices are potentially mobile, and movement of the Bluetooth devices necessitates corresponding link changes as a result of such movement. The Bluetooth standard defines piconets formed of a master and slave relationship between one Bluetooth device forming a master and up to seven Bluetooth devices forming slaves to the master. A master of one piconet might also be a slave in another piconet, and the piconets together define a scatternet. Communications are also effectuable between Bluetooth devices positioned within different piconets. And, piconets are dynamically configured and reconfigured, as necessary, to accommodate communications between the Bluetooth devices.

A Bluetooth communication station forming a master device in a piconet controls channel access needed for communications between all communication stations of the piconet. And, in particular, in conventional operation, all communications effectuated in the piconet are communicated by way of the communication station forming the master device. As a result, direct communications between slave devices of the piconet do not conventionally occur.

Therefore, conventionally, to effectuate communications between slave devices within a piconet, channel allocations must be made between the slave devices and the master device. Information to be communicated by a first of the slave devices is first communicated to the master device. Thereafter, in turn, the master device forwards on the information to a second of the slave devices. Inherent inefficiencies result as channel allocations are required along two communication paths, i.e., between a first slave device and the master device and between the master device and a second slave device.

Alternately, due to the dynamic nature of configuration of piconets, when slave device-to-slave device communications are to be effectuated, an additional piconet can be defined. One of the slave devices between which the slave device-to-slave device communications are to be effectuated is defined to be the master device of the newly-configured piconet. Communications between the slave device and the slave/master device are thereafter directly effectuable. However, the same frequency band is utilized for communications in the two piconets. Resultant interference between communications at the separate piconets, within the same frequency band, might well diminish communication quality levels of the communications.

Existing manners by which to effectuate communications between slave devices, as a result, are either inherently inefficient or potentially reduce communication quality levels of communications in the communication system.

If a manner could be provided by which to permit direct communications between slave devices of a piconet, improved communications within the piconet would be possible.

It is in light of this background information related to communications between communication stations of a wireless network that the significant improvements of the present invention have evolved.

SUMMARY OF THE INVENTION

The present invention, accordingly, advantageously provides apparatus, and an associated method, by which to allocate communication capacity to facilitate communications between communication stations of a radio communication system, such as a Bluetooth-compatible communication system.

Through operation of an embodiment of the present invention, a manner is provided by which to allocate communication capacity for communications between the slave devices of a Bluetooth piconet, or other radio communication system. Direct communications are permitted within a single piconet, thereby obviating the need to define more than one piconet to effectuate the communications or to communicate by way of a master device. In contrast to existing manners to effectuate communication between slave devices, more efficient utilization of the communication capacity available in a piconet is permitted through operation of an embodiment of the present invention.

In one aspect of the present invention, a manner is provided by which to permit direct slave device-to-slave device communications in a Bluetooth piconet when ACL (asynchronous connectionless link) communications are effectuated by the devices of the piconet. The master device defined in the piconet is operable to receive a request by one of the slave devices for the allocation of communication capacity to communicate information with another slave device. The request, for example, further includes an indication of the communication capacity required to effectuate the desired communications. Responsive to the request, the master device allocates one or more time slots forming a channel, or channels, to the slave devices to permit direct slave device-to-slave device communications. One or more time slots are allocated for the communications, and such time slots are reserved for such communications. Other communications at the piconet are effectuated, for example, pursuant to a hopping pattern which forms a reduced hopping sequence (RHS). ACL communication links can also, e.g., be supported as SCO (synchronous connection-oriented) links. The reduced hopping sequence excludes the time slots forming channels to which allocation is made for the communication of information between the slave devices. While the reduced hopping sequence marginally reduces throughput capabilities in the system, slave device-to-slave device communications are provided, without requiring a multiple of connections to communicate by way of a master device.

In another aspect of the present invention, a manner is provided by which to permit slave device-to-slave device communications when an SCO (synchronous connection-oriented), or other, communication is also to be effectuated. A request is generated by one of the slave devices for allocation thereto of channel capacity to communicate with another slave device. The request is communicated to the master device of the piconet. Responsive to the request, channel allocations are made to permit the slave device-to-slave device communications. Time slots are allocated to permit the effectuation of the communications between the slave devices during periods when the SCO link utilized for other communications is completed or otherwise not used. That is to say, communications between the slave devices are not effectuated during a communication session utilizing a SCO link. As allocation is made for the communication of information directly between slave devices, efficient utilization of the channel capacity of a piconet is provided.

In one implementation, slave device-to-slave device communications are effectuable between any pair, or more, of slave devices of a piconet. A direct communication path between the slave devices is provided without resort to configuration of additional piconets or requiring a communication path between the two slave devices to include a master device. The master device is operable, responsive to a request for channel allocation, to selectively allocate channels to permit the communications between the slave devices. Determinations are made as to the type of communications to be effectuated at the piconet, and appropriate allocations of channel capacity are made responsive thereto.

In these and other aspects, therefore, apparatus, and an associated method, is provided in a radio communication system. The radio communication system includes at least a first set of communication stations forming at least a first network set operable to communicate upon a common set of channels. The first set has a master-device station, a first slave-device station, and at least a second slave-device station defined therein. Communication between the first and at least second slave-device stations is facilitated. A request detector is coupled to receive indications of a request for allocation of channel capacity to permit the communication between the first and at least second slave-device stations. A channel allocator is coupled to the request detector. The allocator selectably allocates channel capacity for the communications between the first and at least second slave-device stations. Allocations made by the channel allocator are responsive, at least in part, upon other communications in the radio communication system.

A more complete appreciation of the present invention and to the scope thereof can be obtained from the accompanying drawings which are briefly summarized below, the following detailed description of the presently-preferred embodiment of the invention, and the appended claims.

DETAILED DESCRIPTION OF THE PREFERRED EMBODIMENT

Figure 1:
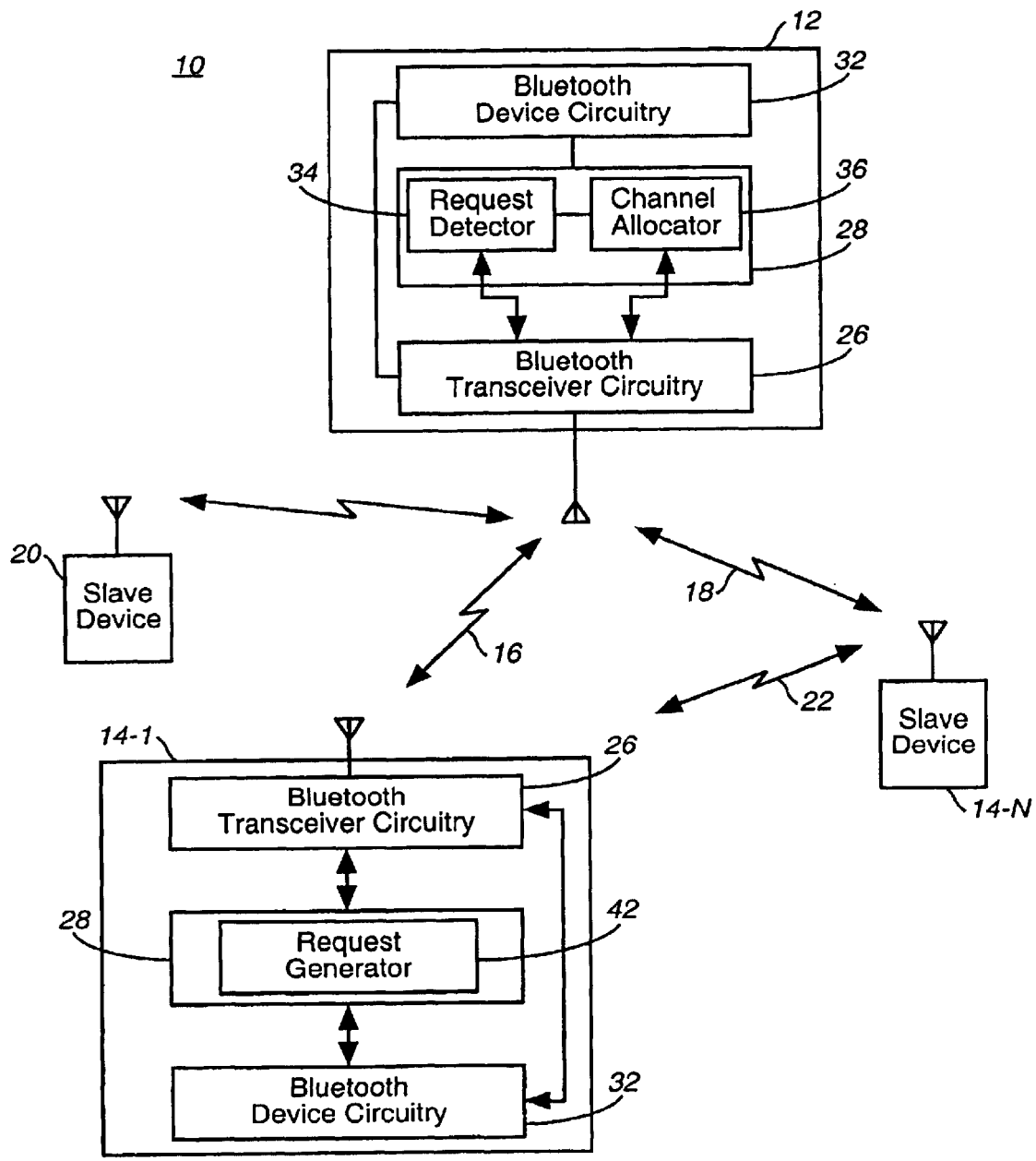
FIG. 1 illustrates a functional block diagram of a communication system in which an embodiment of the present invention is operable.

Referring first to FIG. 1, a communication system, shown generally at 10, provides for radio communications between a plurality of communication stations. In the exemplary implementation, the communication system is formed of Bluetooth-compatible devices, here together forming a Bluetooth piconet. While the following description of the present invention shall be described with respect to a Bluetooth-compatible system, such a system is representative of a wireless communication system. In other implementations, various embodiments of the present invention can similarly be described with respect to such other wireless communication systems.

The system 10 here includes a plurality of communication stations, dynamically-configurable to include a master device 12 and a plurality of slave devices 14-1 through 14-N. Here, two of the slave devices 14-1 and 14-N are illustrated. A piconet includes up to seven slave devices 14.

Designation of the communication stations as master or slave devices in the piconet are dynamically designated. That is to say, any of the communication stations can form a master device or a slave device. And, the communication stations can be members of more than one piconet. A communication station being a member of more than one piconet can form a slave device in both of the piconets or a master device in one of the piconets and a slave device in another of the piconets.

Information is communicated between the communication stations of a piconet by way of radio links formed upon channels defined pursuant to the Bluetooth specification. Namely, a time division communication scheme is provided in which time slot-frequency combinations form the channels upon which the radio links are formed. Allocation of the channels to permit the formation of radio links and the subsequent effectuation of communications in the piconet is controlled by the master device of the piconet, here the master device 12. Radio links, such as the radio link 16 and radio link 18 are formable upon channels allocated for communications within the piconet. The radio link 16 is here formed between the slave device 14-1 and the master device 12. And, the radio link 18 is here formed between the slave device 14-N and the master device 12.

A radio device 20 is also shown in the Figure. Here, the slave device 20 is representative of a slave device of the piconet.

A radio link 22 is also shown in the Figure. The radio link 22 is formed between the slave device 14-1 and the slave device 14-N and is permitted pursuant to operation of an embodiment of the present invention. That is to say, through operation of an embodiment of the present invention, information is permitted to be directly communicated between slave devices of the piconet, such as by way of the radio link 22. By providing a manner by which to permit direct communication of information between slave devices, efficient utilization of the channel capacity permitted in a piconet is facilitated while also maintaining appropriate communication quality levels, also to facilitate communication of the information between the slave devices.

The master device 12 includes Bluetooth transceiver circuitry 26 to which control apparatus 28 is coupled. The master device is also shown to include Bluetooth device apparatus 32. The apparatus 32 is representative of a functional portion of the master device and is exemplary of any apparatus to which the Bluetooth transceiver circuitry is connectible.

The control apparatus 28 in the exemplary implementation, is formed of a controller having algorithms executable thereat. The control apparatus is here shown to include the functional elements 34 and 36 of an embodiment of the present invention. While in the exemplary implementation, the functional elements 34 and 36 are representative of functions performed by the control apparatus 28, in other implementations, the elements 34 and 36 are structurally formed in other manners but operable to provide the functions of such respective elements.

The element 34 forms a request detector which is coupled to the Bluetooth transceiver circuitry 26. The element 36 forms a channel allocator which is coupled both to the request detector 34 and to the Bluetooth transceiver circuitry 26.

The slave device 14-1 is also shown to include the Bluetooth transceiver circuitry 26, control apparatus 28, and Bluetooth device apparatus 32. Other slave devices 14 analogously include such structure.

The control apparatus 28 of the slave device 14-1 includes a request generator 42. Again, the element forming the request generator is represented functionally, and, in other implementations, the functions of the request generator are performed by structure other than the control apparatus 28 of the exemplary implementation.

In operation of an embodiment of the present invention, when the slave device 14-1 is to communicate with another slave device, here the slave device 14-N, the request generator 42 is caused to generate a request for allocation of communication capacity thereto by which to form a radio link, here the radio link 22, to permit the effectuation of communication with the slave device 14-N. The request generated by the request generator is provided to the transceiver circuitry 26 of the slave device. The transceiver circuitry transmits the request by way of a radio link, such as the radio link 16, with the master device 12. Corresponding Bluetooth transceiver circuitry 26 of the master device receives the request and forwards indications thereof to the request detector 34. The request detector is operable to detect the indications of the request for the allocation of channel capacity to form the radio link 22. The channel allocator 36 is operable, responsive to the request for the allocation to allocate an appropriate level of communication capacity upon which to form the radio link 22. One or more time slots, for instance, are allocated responsive to the request. Indications of the channel allocation are communicated, through operation of the transceiver circuitry 26, by way of the radio links 16 and 18 to the appropriate slave devices. Thereafter, a radio link is formable between the slave devices and direct slave device-to-slave device communications are effectuable.

In the implementation shown in the Figure, the master device is also to communicate, by way of an ACL link, with a slave device 20. Because of the allocation of channel capacity to permit the formation of the radio link 22, channel allocations to permit other communications at the piconet, or between piconets, is selected such that concurrent ACL communications are effectuable. A reduced hopping sequence (RHS) is utilized so that communications between the master device 12 and the slave device 20 do not interfere with communications between the slave devices 14-1 and 14-N.

Figure 2:
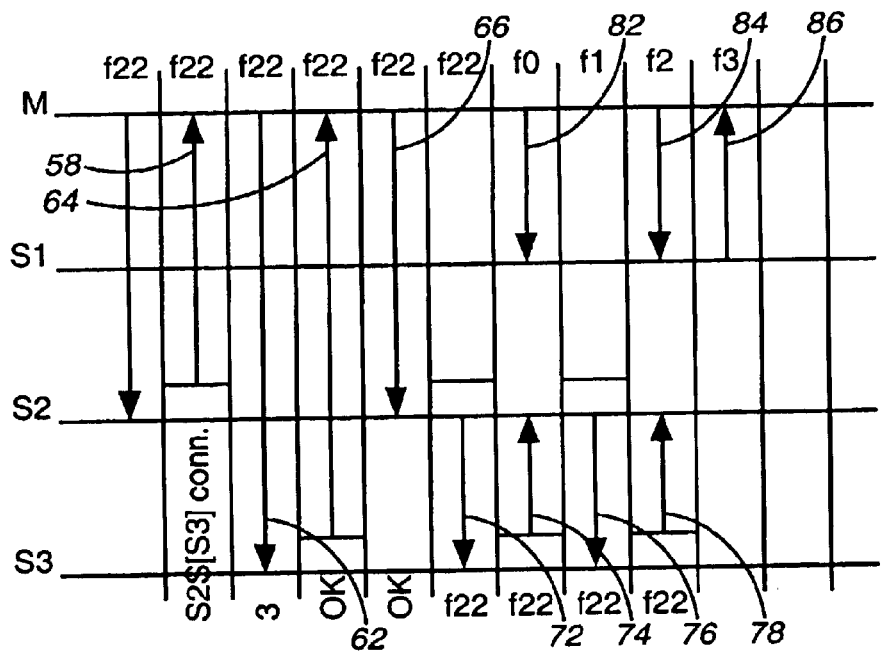
FIG. 2 illustrates a timing sequence representative of exemplary operation of the communication system shown in FIG. 1 pursuant to an embodiment of the present invention.

FIG. 2 illustrates a timing sequence, shown generally at 52, representing signaling between the communication stations of the communication system 10 shown in FIG. 1. Communications are here shown to be effectuated upon channels indicated by F22, F0, F1, F2, and F3 in the Figure. Exemplary operation an embodiment of the present invention by which communications are to be effectuated between the slave devices 14-1 and 14-N while also permitting communications between the master device 12 and slave device 20 are represented. An ACL link is again formed between the master device and the slave device 20.

When the slave device 14-1 desires to effectuate communications with the slave device 14-N, a request is generated thereat and communicated to the master device 12. Transmission of the request is indicated by the segment 58. An indication is contained in the request as to the channel allocation requirements, that is, the number of time slots that are required to be allocated to effectuate the communication with the slave device. Responsive to the request, the master device transmits a message, indicated by the segment 62, to the slave device 14-N to inform the slave device of the request generated by the slave device 14-1. If the slave device 14-N is in a power-save mode, the message 62 functions also to wake up the slave device.

The slave device 14-N acknowledges the receipt of the message by a return message, indicated by the segment 64. Thereafter, and as indicated by the segment 66, channel allocations formed by the channel allocator 36 (shown in FIG. 1) is provided by the master device 12 to the slave device 14-1, indicated by the segment 66 in the Figure. In this exemplary implementation, four time slots are allocated for the communications between the slave devices. And, the segments 72, 74, 76, and 78 are representative of communications between the slave devices 14-1 and 14-N at exemplary frequency F22 during the four time slots. Also, during the same time slots, the master device 12 is able to communicate with the slave device 20 on channels F0, F2, and F3, indicated by the segments 82, 84, and 86. Communications between the master and slave device 20, here, for purposes of example, is effectuated utilizing a reduced hopping sequence so as not to interfere with communications between the slave devices 14-1 and 14-N.

Figure 3:
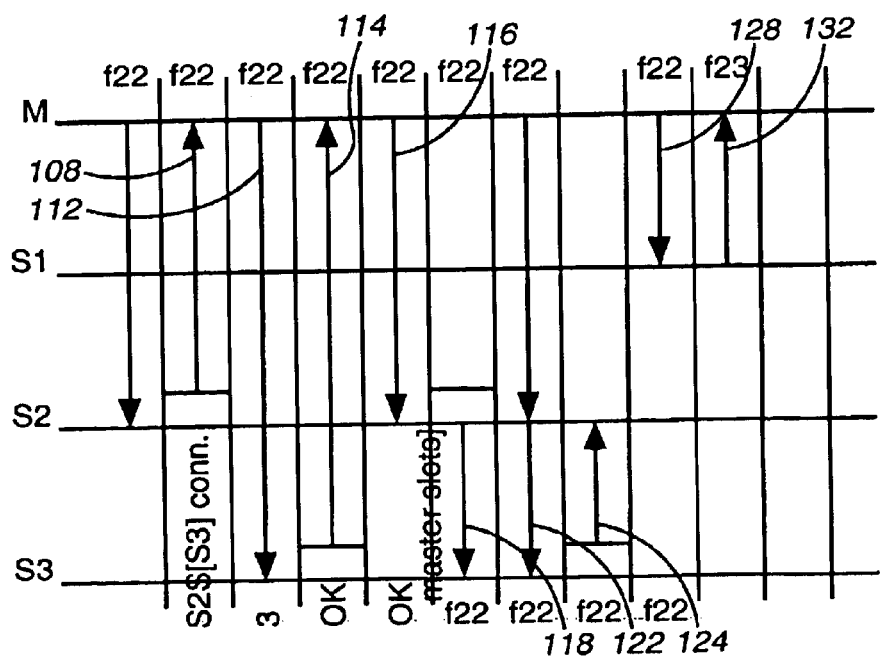
FIG. 3 illustrates a another timing sequence representative of exemplary operation of the communication system shown in FIG. 1 pursuant to another embodiment of the present invention.

FIG. 3 illustrates a timing sequence shown generally at 102, representative of operation of an embodiment of the present invention when an SCO link is formed between the master device and slave device 20. An SCO link requires all channels to be utilized for its effectuation. So, in contrast to the channel allocation described with respect to the exemplary implementation shown in FIG. 2, channel allocation must be alternately effectuated.

Again, when the slave device 14-1 desires to effectuate communications with the slave device 14-N, a request is generated and transmitted, here indicated by the segment 108, to the master device 12. Upon receipt of the request, the master device generates and transmits, indicated by the segment 112, an indication to the slave device 14-N to inform the slave device of the request by the slave device 14-1. And, as indicated by the message 114, the slave device 14-N acknowledges receipt of the message transmitted thereto. Then, and as indicated by the segment 116, the channel allocation is provided by the master device to the slave device 14-1.

Due to the SCO link, reduced hopping sequence allocation of channels is not permitted, and the SCO link requires use of all the available channels, according to a frequency hopping sequence. Here, then, the master device allocates channels to insure that slave device-to-slave device communications do not occur while the SCO link communications are effectuated.

Segments 118 and 124 are representative of communications between the slave devices 14-1 and 14-N, and segment 122 is representative of communications between the master device 12 and a slave device. And, segments 128 and 132 are representative of communications between the master device 12 and the slave device 20. Communications between the slave devices and between the master device and slave device 20 occur at non-concurrent time slots.

Figure 4:
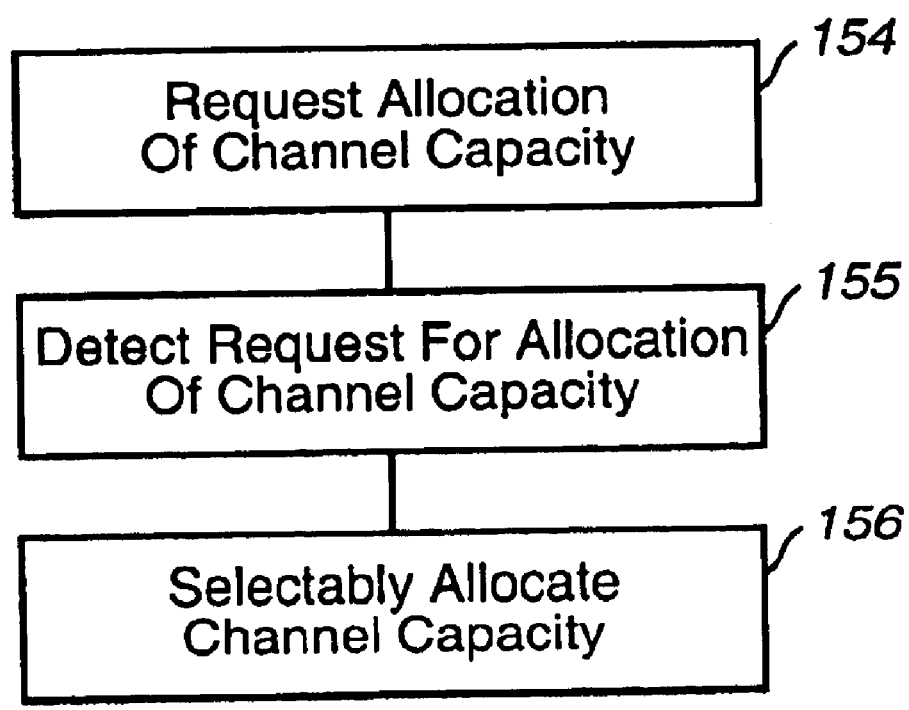
FIG. 4 illustrates a method flow diagram listing the method of operation of the method of an embodiment of the present invention.

FIG. 4 illustrates a method, shown generally at 152, of an embodiment of the present invention. The method 152 is operable to facilitate communication between a first and a second slave-device station operable in a radio communication system, such as a Bluetooth piconet.

First, and as indicated by the block 154, a request for allocation of channel capacity to permit the communication between the first and second slave-device stations is detected. Then, and as indicated by the block 155, a request for allocation of channel capacity to permit the communication between the first and second slave-device stations is detected. Then, and as indicated by the block 156, channel capacity for the communication between the first and second slave-device stations is selectably allocated. Allocations are made responsive, at least in part, upon other communications in the radio communication system.

Thereby, direct slave device-to-slave device communications are effectuable. The need to communicate by way of a master device, or to define multiple piconets, is obviated. More efficient communications in the communication system are thereby possible.

The previous descriptions are of preferred examples for implementing the invention, and the scope of the invention should not necessarily be limited by this description. The scope of the present invention is defined by the following claims.

We claim:

1. In a radio communication system having at least a first set of communication stations forming at least a first network set operable to communicate upon a common set of channels according to a selected frequency hopping scheme, the first set having a master-device station, a first slave-device station, a second slave-device station and at least a third slave-device station defined therein, an improvement of apparatus for facilitating communication between the first and at least second slave-device stations, respectively, said apparatus comprising:

a request detector coupled to receive indications of a request for allocation of channel capacity to permit the communications between the first and at least second slave-device stations; and a channel allocator coupled to said request detector, said allocator for selectably allocating channel capacity for the communications between the first and second slave-device stations, allocations made by said channel allocator responsive, at least in part, upon other communications in the radio communication system, such that the other communications in the radio communication system are effectuable according to the selected frequency hopping scheme;

wherein the channel capacity allocated by said channel allocator providing for communications between the first and second slave-device stations includes an allocation of time periods that are nonoverlapping with time periods allocated for the other communications.

2. The apparatus of claim 1 wherein said request detector and said channel allocator are located at the master-device.

3. The apparatus of claim 1 wherein the radio communication system comprises a Bluetooth-compatible communication system, wherein the at least the first network set comprises a first piconet, and wherein the request for the allocation of the channel capacity to which said request detector is coupled to receive comprises a request for at least one time slot of a time frame provided for communication within the first piconet.

4. The apparatus of claim 1 wherein the master-device station is operable to communicate pursuant to a SCO (synchronous connection) link at least with the third slave-device station, and wherein said channel allocator allocates the channel capacity for the communications between the first and at least second slave-device stations responsive, at least in part, to the SCO link pursuant to which the master-device station is operable to communicate with the third slave-device station.

5. The apparatus of claim 4 wherein the channel capacity allocated by said channel allocator permits communications between the first and at least second slave-device stations only during the time periods free of communications by way of the SCO link.

6. The apparatus of claim 1 wherein the master-device station is operable to communicate pursuant to a SCO link with a selected communication station of the first set of communication stations and wherein allocations made by said channel allocator are made responsive, at least in part, upon communications by the master-device station pursuant to the SCO link.

7. The apparatus of claim 1 wherein the request for allocation of channel capacity, indications of which said request detector is coupled to receive is generated by a selected one of the first and at least second slave-device stations.

8. In a method for communicating in a radio communication system having at least a first set of communication stations forming at least a first network set operable to communicate upon a common set of channels according to a selected frequency-hopping scheme, the first set having a master-device station, a first slave-device station, a second slave-device station and at least a third slave-device station, an improvement of a method for facilitating communication between the first and at least second slave-device stations, respectively, said method comprising:

detecting a request for allocation of channel capacity to permit the communication between the first and at least second slave-device stations; and selectably allocating channel capacity for the communication between the first and second slave-device stations, allocations made responsive, at least in part, upon other communications in the radio communication system, such that the other communications in the radio communication system are effectuable according to the selected frequency hopping scheme;

wherein the channel capacity selectably allocated providing for communications between the first and second slave-device stations includes an allocation of time periods that are nonoverlapping with time periods allocated for the other communications.

9. The method of claim 8 wherein said operations of detecting and selectably allocating are performed at the master-device station.

10. The method of claim 9 further comprising the operation, prior to said operation of detecting, of requesting the allocation of the channel capacity, said operation of requesting performed by a selected one of the first and at least second slave-device stations.

11. The method of claim 10 wherein the radio communication system comprises a Bluetooth-compatible communication system, wherein the at least the first network set comprises a first piconet, and wherein the request generated during said operation of requesting comprises a request for at least one time slot of time frame provided for communications within the first piconet.

12. The method of claim 8 wherein the master-device station is operable to communicate pursuant to a SCO (synchronous connection) link with at least the third slave-device station, and wherein the allocations made during said operation of selectably allocating allocates channels responsive, in part, to the SCO link.

\* \* \* \* \*